3,326,721
NICKEL CADMIUM BATTERIES
Ian H. S. Henderson and Stephan G. Ladan, Ottawa, Ontario, Canada, assignors to Her Majesty the Queen in right of Canada as represented by the Minister of National Defence
Filed June 10, 1963, Ser. No. 286,664
11 Claims. (Cl. 136—24)

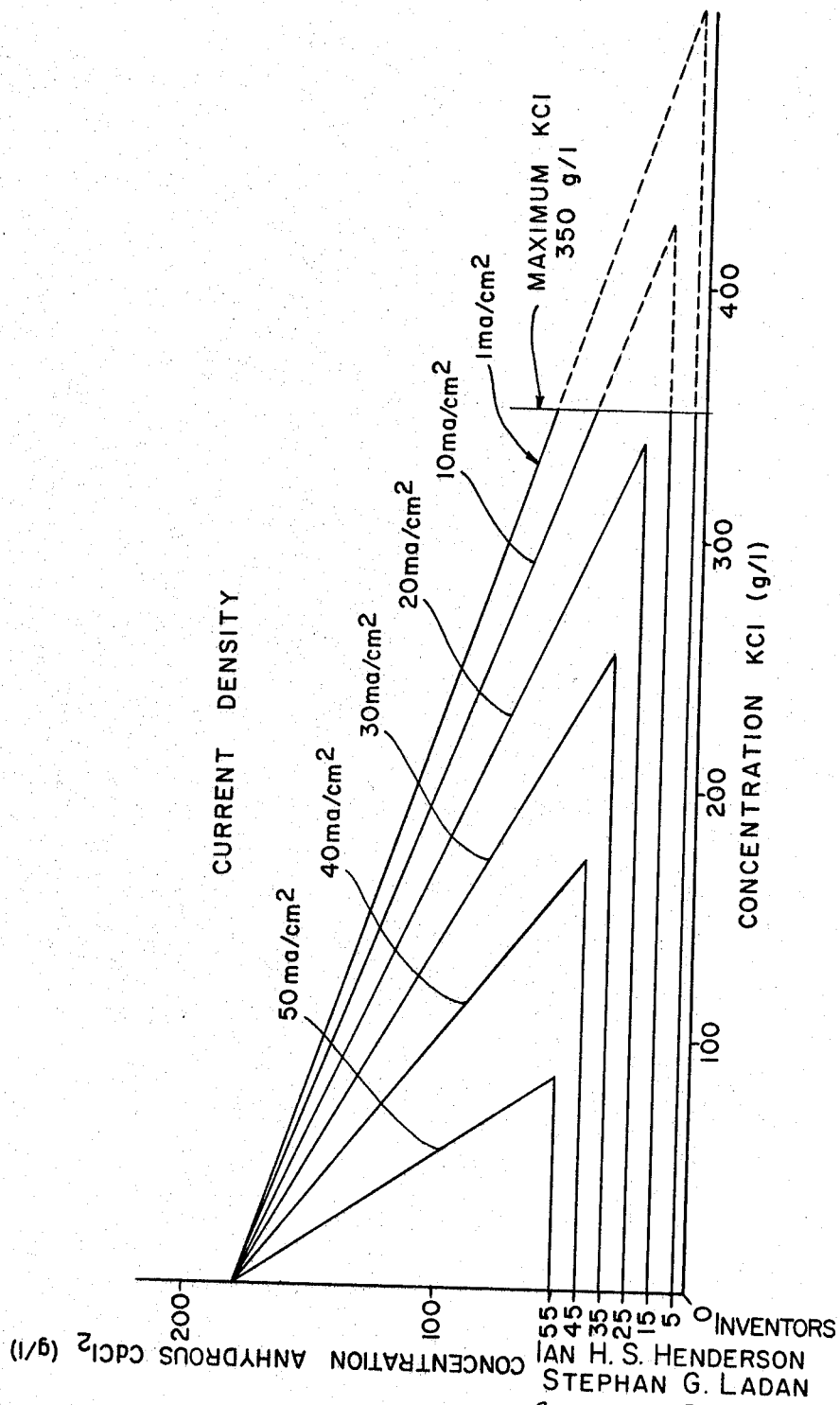

This invention relates to negative plates for alkaline storage batteries of the type employing cadmium as the active material of the negative plate. More particularly this invention relates to improved negative plates for alkaline storage batteries and methods of producing same, said negative plates being characterised by having electrolytically deposited sponge cadminum as the active material.

Conventional high-rate nickel cadmium batteries employ negative plates manufactured by depositing, by chemical and electrochemical means, a thin layer of metallic cadmium over the internal and external surfaces of a porous sintered nickel plaque. One method of depositing this cadmium is to dip the nickel plaque firstly into a solution of a cadmium salt and secondly into an alkaline solution to deposit cadmium hydroxide within the pores of the nickel plaque, and thereafter to reduce the cadmium hydroxide to metallic cadmium. In practice, at least the first two steps have to be repeated a number of times in order to obtain sufficient amounts of cadmium.

In another method of obtaining negative plates for alkaline storage batteries, as described in U.S. Patent, 2,616,939 to Fischbach, a supporting metal screen is pasted with a mixture of cadmium oxide and water, and the pasted cadmium oxide is thereafter formed cathodically into metallic sponge cadmium. These plates, however, have a limited cycle life.

The conventional methods of manufacturing cadmium negative plates suffer from a number of disadvantages. Usually a number of steps are required in the manufacturing operation, which contributes significantly to the over-all expense of producing plates. Furthermore, in the common type of negative plate, an expensive sintered nickel plaque is required as a substrate. Finally, by whatever method the negative plates have been produced, their electrical characteristics have left something to be desired. Typically, only one gram of electrochemically active cadmium is present per 5 to 5.5 grams of negative plate having a total thickness of from 0.02 to 0.035". Under conditions of high charge and discharge rates, and under prolonged over-discharged, the plates tend to break up and lose capacity.

An electrochemically active deposit, as referred to herein, is one that can be electrochemically oxidised in a reversible fashion at a rate compatible with battery operation.

It has now been found that improved negative plates may be made by a process involving the direct electrodeposition of cadmium sponge on a suitable electronically conducting substrate.

Various forms of electrodeposited cadmium are of course known. Cadmium plating is generally employed for its protective value and for such purposes cyanide plate baths or fluoborate plating baths are usually employed. Sponge cadmium deposits are known, but are generally non-adherent and non-coherent, that is, the deposit is either obtained in the form of a powder which falls off the cathode, or it is loosely adherent, shedding readily under mechanical deformation of the cathode. Substantially all such deposits are useless for the purposes of the present invention.

In accordance with the present invention, alkaline storage batteries may be manufactured having a negative plate produced by electro-deposition from an aqueous bath containing cadmium ion and chloride ion on to an electronically conducting substrate which is electroplatable by metallic cadmium and which is substantially inert at the negative plate of alkaline storage batteries, the cadmium ion concentration in said bath being between about 3 and about 245 grams per litre and the chloride ion concentration in said bath being between about the stoichiometrical value for cadmium chloride based on the cadmium ion present and about 190 grams per litre, the cathodic current density being between about 1 milliampere per square centimetre and about 60 milliamperes per square centimetre, the cadmium ion and chloride ion concentrations, and the current density being such that an adherent and coherent electrochemically-active cadmium sponge deposit is obtained on said substrate.

Within the limits of cadmium ion, chloride ion concentrations and cathodic current density referred to above, there exist substantial areas in which the required type of deposit may be obtained. However, it appears to be impossible, based on present knowledge, to define exactly those areas in which useful deposits will be obtained, since a number of other variables affect the nature of the deposit. Generally the higher the current density, the lower is the maximum chloride ion concentration which may be used, only at current densities of about 60 milliamperes per square centimetre, little or no stoichiometrical excess of chloride ion can be tolerated and the bath composition has to approach a solution of cadmium chloride. On the other hand, at current densities of below 20 milliamperes per square centimetre the highest chloride ion concentrations which may be tolerated would approach 190 grams per litre, which corresponds approximately to a dissolved potassium chloride concentration of 350 grams per litre together with the chloride ion contributed by cadmium chloride. With the lower current densities referred to above, quite low cadmium ion concentrations can be employed, for instance, down to a concentration equivalent to that given by a 5 grams per litre cadmium chloride solution at the minimum current densities. On the other hand, at higher current densities, for instance 50 milliamperes per square centimetre, concentrations of cadmium chloride below about 55 grams per litre will not generally be useful. The highest concentrations of cadmium ion, namely up to about 245 grams per litre, corresponding to about 400 grams per litre of anhydrous cadmium chloride, are only useful at low current densities and at low concentrations of chloride ion, that is with only small excess of chloride ion over the stoichiometrical equivalent of the cadmium chloride. Up to about 110 grams per litre of cadmium ion corresponding to about 180 grams per litre of anhydrous cadmium chloride, a current density within the range 1 to 60 milliamperes per square centimetre may be employed always observing the lower limit for the cadmium ion concentration referred to above. However, above 180 grams per ltire of cadmium chloride or its equivalent cadmium ion concentration, only low current densities may be employed, and the maximum cadmium ion concentration referred to, namely 245 grams per litre, applies only to the lowest current densities of all, namely about 1 to 5 milliamperes per square centimetre, while with current densities of 10 to 20 milliamperes per squre centimetre, this area of operation is greatly reduced, disappearing altogether at about 20 milliamperes per square centimetre, so that at about this current density, the 180 grams per litre of cadmium chloride limit mentioned above applies.

For room temperature (20–25° C.) operation of the plating bath, these areas of operation can be more precisely defined, as appears from the following:

In the main area of operation, that is at cadmium chloride concentrations of below 180 grams per litre (or the equivalent cadmium ion concentration of below 110 grams per litre), the possible range of dissolved cadmium chloride concentration can be defined as lying between $(5+c)$ grams per litre and 180 grams per litre, and the corresponding permissible chloride ion concentrations, calculated as potassium chloride for the sake of simplicity, can be defined as lying between 0 and a value given by the expression:

$$\frac{510\,(180-w)\left(1-\frac{c}{60}\right)}{175-c} \text{ grams per litre}$$

In the above expressions, $c$ represents a number equal to the cathodic current density measured in milliamperes per square centimetre and $w$ is a number equal to the dissolved cadmium chloride concentration in the bath measured in grams per litre. The current density itself, as noted earlier, can be within the range 1–60 milliamperes per square centimetre. This chloride ion concentration of course refers to the excess of chloride ion over the stoichiometric value for the cadmium chloride. The maximum amount of potassium chloride is approximately 350 grams per litre, this being the solubility limit at these temperatures. If a chloride other than potassium chloride is to supply the excess chloride ion concentration, the permissible concentration may be defined in the following terms:

The chloride ion for the concentration in excess of the stoichiometrical value for cadmium chloride based on the cadmium ion present may be varied between 0 and a value given by the expression:

$$\frac{245\,(180-1.63w')\left(1-\frac{c}{60}\right)}{(175-c)} \text{ grams per litre}$$

If the same maximum value as for potassium chloride is considered to apply, the last referred to expression would be subject to a maximum value of about 167 grams per litre. In the above expression, $c$ and $w$ are as defined above, and $w'$ is a number equal to the cadmium ion concentration in the bath, also expressed as grams per litre.

The minor area of operation, namely that area in which concentrations of cadmium chloride from about 180 to about 400 grams per litre are used, and with concentrations of potassium chloride up to about 20 grams per litre (or the equivalent cadmium ion and chloride ion concentrations) can also be defined more exactly for conditions of operation carried out with the bath at approximately room temperature and the pH in the self-stabilizing range of 5.0 to 6.0. Conveniently the cadmium chloride concentration may be considered as falling between 175 and 400 grams per litre (even though this results in a slight overlap with the main area of operation referred to earlier), and the permissible potassium chloride concentration may vary from 0 to about 20 grams per litre, but subject to a maximum value given by the expression:

$$0.089\,(400-w) \text{ grams per litre}$$

wherein $w$ has the numerical value of the cadmium chloride concentration measured in grams per litre. An equivalent expression can be derived for the corresponding cadmium ion and stoichiometric excess chloride ion concentrations.

The main area of operation referred to is depicted in the accompanying drawing. The experimental data forming the basis for this drawing was obtained with electrolytic baths containing varying concentrations of cadmium chloride and potassium chloride, the pH being a self-stabilizing range of 5.0 to 6.0 and the temperature being 20–25° C. A cadmium anode was used and cadmium-plated nickel foil of approximately 0.0015″ thick was employed as a cathode. The drawing shows, with $CdCl_2$ concentration as ordinate and KCl concentration as abcissa, the composition regions within which suitable deposits of cadmium sponge are obtained at current densities of 1, 10, 20, 30, 40 and 50 milliamperes per square centimetre. Beyond the maximum permissible KCl concentration of 350 grams per litre limit the curves are continued by means of broken lines to show their relationship to the expressions for the KCl concentration given above.

With baths of this type, that is, with cadmium chloride baths with varying amounts of additional chloride ion supplied by KCl, various types of cadmium deposit may be obtained. These may be classified as follows:

(I) Fine crystalline deposits of decorative or protective value.
(II) Coarse crystalline and dendritic deposits.
(III) Non-adherent powder of form varying from crystalline to "spongy."
(IV) Moderately coherent, non-adherent, dark grey to black, brittle sponge containing co-precipitated cadmium salts in varying amounts. Some 20–30% of this deposit may be electrochemically active for a limited number of charge-discharge cycles, but the deposit sheds very badly under mechanical deformation, or under conditions of deep discharge, over-discharge and overcharge.
(V) The sponge deposit produced according to the present invention is both adherent to its substrate and coherent, and is soft and flexible. From 50 to 70% of the metallic deposit is electrochemically active, giving excellent performance as a battery plate both electrically and mechanically when subjected to severe conditions of high rate cycling and to overcharge and over-discharge.

As will be clear from the preceding description, deposits of type V, i.e. that desired for the present invention, lie generally within the triangular area bounded by each curve. Below the base of each triangular area, deposits of type III with or without some hydrogen evolution, are generally obtained at the higher current densities, whereas deposits of type I or IV may be obtained at the lower current densities. Deposits of type I and type II are generally obtained under the conditions corresponding to the areas to the right of the triangles, that is, under the conditions of both fairly high cadmium chloride concentration and fairly high potassium chloride concentration. The areas near the border line, i.e. in areas near the hypotenuse of the triangles, particularly at the lower current densities, deposits of type IV are usually obtained, although at current densities of 40 milliamperes per square centimetre and above, the area corresponding to compositions giving type IV deposits may not lie adjacent to the triangles but may be separated by an area in which type I and type III deposits are obtained. An increased temperature to say 30 to 40° C. encourages the formation of type I and type II deposits and increases the adherence of deposits of type III. A decrease in temperature increases the tendency to form deposits of type III. Furthermore, a change of temperature may be said to displace the area within which the best yields of the desired deposits of type V are obtained towards the abcissa for a temperature increase and away from the abcissa for a temperature decrease. However, within the range 10° to 80° C., the effects of temperature are not so large as to render the expressions for the cadmium and chloride concentrations invalid. Within this range, but outside the temperature range 20° to 25° C. for which the expressions were calculated, there will still be obtained some deposit of electrochemically active cadmium sponge.

The effect of pH is fairly small. Lower pH favours a transition from type IV to type V deposits and a pH as low as 1.0 has been used with satisfactory results. However, with low pH, continuous control of pH is necessary, while within the range 5.0 to 6.0 the pH is largely self-regulatory.

The substrate on which the electrodeposition of the cadmium sponge is made, must be an electronically conducting material, and generally must be a material which can be cadmium plated in conventional baths, otherwise non-adherent deposits will be obtained. Furthermore, because the deposit is porous, the substrate must be inert under conditions existing at the negative plate of an alkaline storage battery. Generally the most desirable substrates are cadmium plated foils of nickel, copper, iron or stainless steel. These metals can also be employed without the preliminary cadmium plating, although less satisfactorily. Copper is not completely inert under conditions existing at the negative electrode of an alkaline storage battery during overdischarge, but does not appear to be deleterious to the operation of a cell, providing that overdischarge is prevented. Cadmium plating produces a substrate which is essentially inert, and accordingly this pre-plating step is desirable, particularly as adherent deposits are more readily produced on such a plating. Nickel and copper are particularly desirable as substrates, since thin foils may be readily produced. Foils of 1 to 2 thousandths of an inch may be produced by rolling, while foils down to one tenth of this thickness may be produced electrolytically by plating a cathode to which the deposit is non-adherent, for instance a cathode treated with a very thin layer of a silicone. The extremely thin foil may then be stripped from the cathode, cadmium plated by conventional means if desired, and thereafter made the cathode of an electrolytic bath in accordance with this invention, in order to produce thereon a type V cadmium sponge deposit.

However, instead of foils, substrates of metal gauze, perforated foil or expanded metal can be employed for some applications, although very thin cathodes are desirable in many types of high rate nickel-cadmium and silver-cadmium batteries of the alkaline storage type.

Deposition of sponge cadmium in accordance with the present invention is generally carried out to the extent of about 2 to about 30 milliampere hours per square centimetre of cathode surface. Beyond this there is an increasing tendency for the deposit to become non-adherent and there appears to be a definite maximum to the thickness of adherent sponge cadmium which can be deposited in accordance with the present invention. Under some conditions there may be a tendency for the maximum thickness of deposit to be obtained more readily at low current densities than at high, and accordingly the electro-deposition of sponge cadmium in accordance with the invention may be carried out by the choice of a suitable bath for which the current density may initially be chosen at a high value such as 40 or 50 milliamperes per square centimetre, and later reduced to say 10 or 5 milliamperes per square centimetre, in order to obtain the maximum thickness of adherent sponge deposit. By this means, deposits of a total thickness of from about 0.005 to about 0.014″ in total thickness are obtained and the corresponding total thickness of the negative plate may vary from about 0.005″ (where the thickness of the substrate is only about 0.0002″, and is therefore small compared with the thickness of the deposit) to about 0.015″ or more, depending on the thickness of the substrate.

The deposits of sponge cadmium in accordance with the present invention are from about 50 to about 70% electrochemically active, which compares favorably with the active material of the sintered nickel plate of the prior art. This means that it is possible to produce negative plates in accordance with the present invention of a thickness from about 0.010″ to about 0.015″, which have a plate capacity per unit area approximately equal to conventional sintered plates having a total thickness of from about 0.020″ to about 0.035″. A comparison between 0.020″ sintered plate made according to the chemical procedure described in the prior art, and a plate having a foil substrate and about ½ the above total thickness made in accordance with the present invention, shows that the latter possesses a flatter discharge curve, patricularly under high rates of charge and discharge, and shows less tendency under these severe conditions, to lose capacity on cycling. In particular, plates of this type in accordance with the present invention, may be charged and discharged at a rate corresponding to 6 times the rate at which complete discharge occurs in one hour, i.e. at the 10 minute rate, while still showing a satisfactory discharge curve and satisfactory over-all life for many purposes.

Although the invention has been described above primarily with reference to the use of cadmium chloride and potassium chloride as the constituents of the plating bath, the cadmium ion may be introduced alternatively as the sulfate, nitrate, acetate or phosphate, for example, and the chloride ion may be provided by chlorides of metals other than potassium and cadmium, for instance by sodium, calcium, or other alkali or alkaline earth metal chlorides. It is, however, a preferred embodiment of the invention to employ a bath comprising cadmium chloride and potassium chloride.

If desired, other substances may be added to the bath, such as, for instance, dextrin (in amounts up to 5 grams per litre), and nickel chloride (in amounts up to 15 grams per litre). These substances have a small effect on the nature of the deposits produced, particularly in increasing slightly the proportion of adherent deposit.

Plates made according to the present invention yield a saving in weight of two and one-half times, together with a comparable saving in volume. Three further advantages of the present invention may be cited. Firstly, because of the more direct method of preparation, expensive handling steps in the preparation of conventional plates are avoided. Secondly, the expensive sintered nickel plaque is eliminated. Thirdly, plates of the present invention are superior electrically to sintered negative plates and show little, if any, tendency to shed active material under conditions, such as prolonged over discharge, under which sintered plates tend to break up.

What we claim as our invention is:

1. In the manufacture of alkaline storage batteries employing cadmium as the active material of the negative plate, the improvement which consists essentially of producing said negative plate by direct electrodeposition of cadmium sponge from an aqueous bath containing cadmium ion and chloride ion on to an electronically conducting substrate which is electroplatable by metallic cadmium and which is substantially inert as the negative plate of alkaline storage batteries, the cadmium ion concentration in said bath being between about 3 and about 245 grams per litre and the chloride ion concentration in said bath being between about the stoichiometrical value for cadmium chloride based on the cadmium ion present and about 190 grams per litre, the cathodic current density being between about 1 milliampere per square centimetre and about 60 milliamperes per square centimetre, the cadmium and chloride ion concentrations and the current density beign such that an adherent and coherent electrochemically-active cadmium sponge deposit is obtained on said substrate.

2. In the manufacture of alkaline storage batteries employing cadmium as the active material of the negative plate, the improvement which consists essentially of producing said negative plate by direct electrodeposition of an adherent and coherent electrochemically-active cadmium sponge deposit from an aqueous bath containing cadmium ion and chloride ion on to a cadmium plated substrate, the cadmium ion concentration in said bath being between about 0.61 $(5+c)$ and about 110 grams per litre, and the chloride ion concentration in excess of the stoichiometrical value for cadmium chloride based on the cadmium ion present being between zero and a value not exceeding about 167 grams per litre, given by the expression:

$$\frac{245(180-1.63\,w')\left(1-\dfrac{c}{60}\right)}{(175-c)}$$

wherein $c$ is a number equal to the cathodic current density measured in milliamperes per square centimetre, the current density being within the range of from about one to about sixty milliamperes per square centimetre and $w'$ is a number equal to the cadmium ion concentration in the bath measured in grams per litre, the bath being maintained during said electrodeposition at a temperature of about 10° to 80° C.

3. A method as claimed in claim 2 wherein said temperature is about 20° to 25° C.

4. In the manufacture of alkaline storage batteries employing cadmium as the active material of the negative plate, the improvement which consists essentially of producing said negative plate by direct electrodeposition of an adherent and coherent electrochemically-active cadmium sponge deposit from an aqueous bath containing dissolved therein cadmium chloride in a concentration of from about $(5+c)$ grams per litre to about 180 grams per litre and potassium chloride in a concentration of from about zero to about a value, not exceeding about 350 grams per litre, given by the expression.

$$\frac{510(180-w)\left(1-\dfrac{c}{60}\right)}{(175-c)}$$

wherein $c$ is a number equal to the cathodic current density measured in milliamperes per square centimetre, the current density being within the range of from about one milliampere per square centimetre to about sixty milliamperes per square centimetre, and $w$ is a number equal to the dissolved cadmium chloride concentration in the bath measured in grams per litre, the bath being maintained during said electrodeposition at a temperature of about 10° to 80° C., and at a pH of about 1.0 to 6.0

5. A method as claimed in claim 4 wherein said temperature is about 20° to 25° C.

6. A method as claimed in claim 4 wherein the pH is about 5.0 to 6.0

7. A method as claimed in claim 4 wherein the substrate is a cadmium plated nickel foil.

8. A method as claimed in claim 7 wherein the current density is between about 10 and about 40 milliamperes per square centimetre.

9. A method as claimed in claim 7 wherein the electrodeposition is carried out to the extent of about 2 to 30 milliampere hours per square centimetre of cathode surface.

10. In the manufacture of alkaline storage batteries employing cadmium as the active material of the negative plate, the improvement which consists essentially of producing said negative plate by direct electrodeposition of an adherent and coherent electrochemically-active cadmium sponge deposit from an aqueous bath containing dissolved therein cadmium chloride in a concentration of from about 175 to about 400 grams per litre and potassium chloride in a concentration of from about zero to a value, measured in grams per litre, given by the expression $$0.089\,(400-w)$$

wherein $w$ is a number equal to the dissolved cadmium chloride concentration in the bath measured in grams per litre, the cathodic current density being between about one and about 20 milliamperes per square centimetre and the bath being maintained during said electrodeposition at a temperature of about 20° to 25° C. and at a pH of about 5.0 to 6.0.

11. A method as claimed in claim 10 wherein the substrate is a cadmium plated nickel foil.

References Cited
UNITED STATES PATENTS

| | | | |
|---|---|---|---|
| 2,662,928 | 12/1953 | Brennan | 136—24 |
| 2,870,234 | 1/1959 | Moulton | 136—24 |
| 3,039,943 | 6/1962 | Cox et al. | 204—50 X |
| 3,184,338 | 5/1965 | Mueller | 136—75 |
| 3,184,339 | 5/1965 | Ellis | 136—75 |

WINSTON A. DOUGLAS, *Primary Examiner.*

B. J. OHLENDORF, A. SKAPARS, *Examiners.*